US008410391B2

(12) United States Patent  
Xie

(10) Patent No.: US 8,410,391 B2  
(45) Date of Patent: Apr. 2, 2013

(54) WELD CURRENT GENERATING APPARATUS

(75) Inventor: Ling-Yu Xie, Shenzhen (CN)

(73) Assignees: Hong Fu Jin Precision Industry(ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 458 days.

(21) Appl. No.: 12/762,498

(22) Filed: Apr. 19, 2010

(65) Prior Publication Data

US 2011/0155700 A1 Jun. 30, 2011

(30) Foreign Application Priority Data

Dec. 31, 2009 (CN) .......................... 2009 1 0312961

(51) Int. Cl.  
*B23K 9/10* (2006.01)  
*B23K 11/24* (2006.01)  
(52) U.S. Cl. ..................... 219/115; 219/130.5  
(58) Field of Classification Search .................. 219/115, 219/130.5  
See application file for complete search history.

(56) References Cited

U.S. PATENT DOCUMENTS

| | | | | |
|---|---|---|---|---|
| 3,214,673 A | * | 10/1965 | Cock | 363/77 |
| 6,321,167 B1 | * | 11/2001 | Jochi et al. | 702/60 |
| 2005/0272388 A1 | * | 12/2005 | Giacaman | 455/205 |
| 2006/0243716 A1 | * | 11/2006 | Stava et al. | 219/130.5 |

* cited by examiner

*Primary Examiner* — Tuan T Nguyen  
*Assistant Examiner* — Lance Reidlinger  
(74) *Attorney, Agent, or Firm* — Altis Law Group, Inc.

(57) ABSTRACT

A weld current generating apparatus includes a voltage conversion circuit, a control circuit, a switch circuit, and a current output circuit. The voltage conversion circuit receives an AC voltage from an AC voltage input terminal, and converts the AC voltage to a DC voltage. The control circuit receives the DC voltage, wherein the control circuit is capable of setting a weld time, and outputting a control signal for controlling the weld time. The switch circuit receives the control signal, and turns on for the weld time according to the control signal. The current output circuit outputs a continuous weld current when the switch circuit turns on.

5 Claims, 2 Drawing Sheets

WELD CURRENT GENERATING APPARATUS

BACKGROUND

1. Technical Field

The present disclosure relates to a current generating apparatus, and particularly to a weld current generating apparatus.

2. Description of Related Art

The alloys used to form thermocouples are generally welded together with the use of expensive equipment that provides a high current for the welding process. A simple inexpensive apparatus is desired to overcome the above problem.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
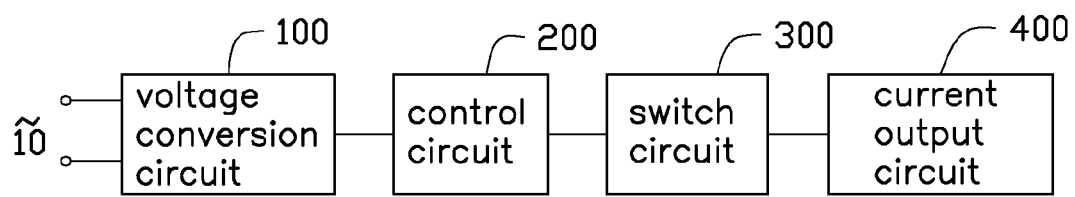
FIG. 1 is a block view of an embodiment of a weld current generating apparatus.

Referring to FIG. 1, a weld current generating apparatus in an embodiment includes a voltage conversion circuit 100, a control circuit 200, a switch circuit 300, and a current output circuit 400. The voltage conversion circuit 100 receives an AC voltage from an AC voltage input terminal 10, and converts the AC voltage to a DC voltage, which provides working voltage to the control circuit 200. The control circuit 200 is capable of setting a weld time, and outputting a control signal for controlling the weld time. The switch circuit 300 receives the control signal, and turns on for the weld time according to the control signal. The current output circuit 400 outputs a continuous weld current when the switch circuit 300 turns on.

Figure 2:
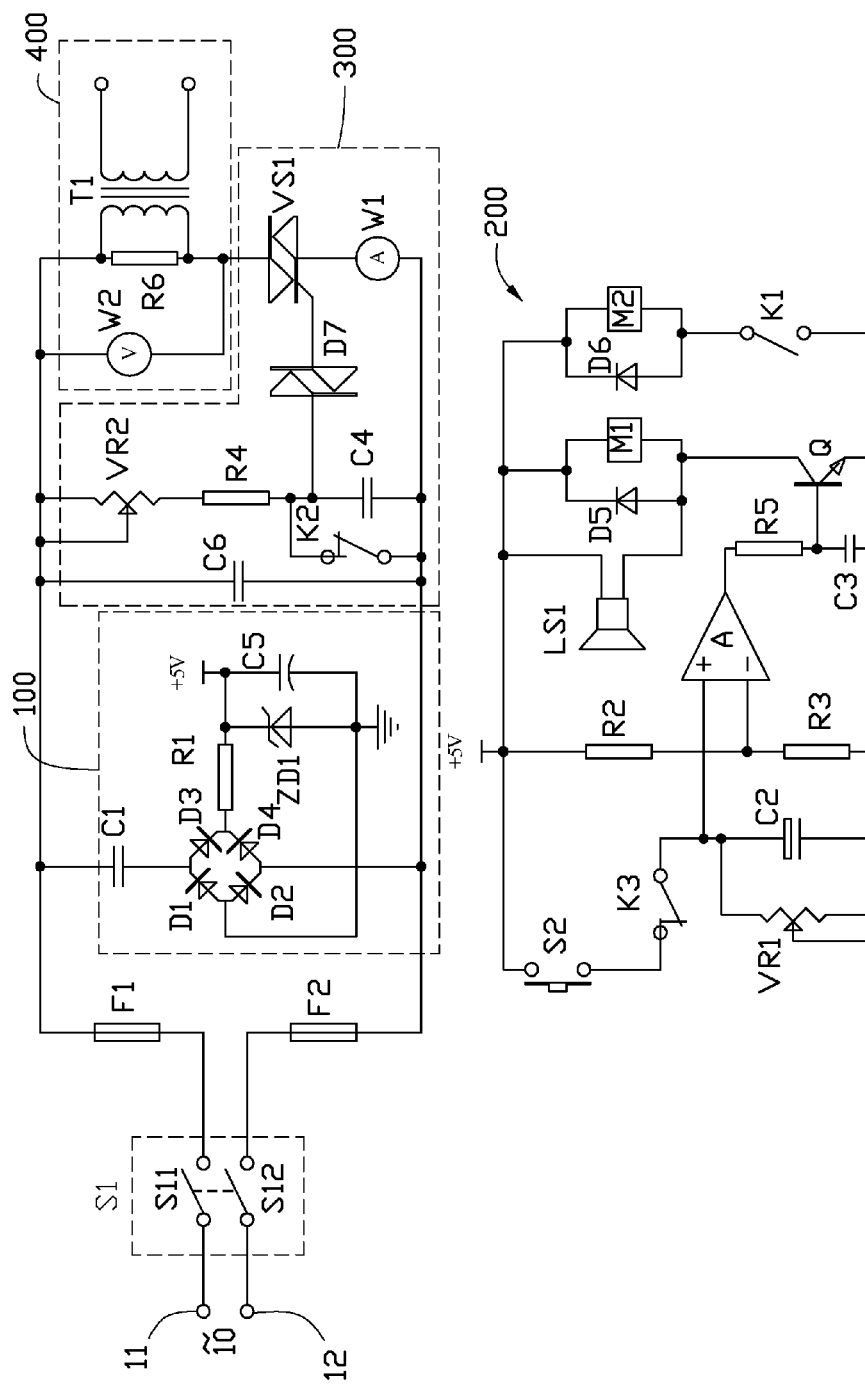
FIG. 2 is a circuit view of an embodiment of the weld current generating apparatus of FIG. 1.

Referring to FIG. 2, the weld current generating apparatus further includes a linked switch S1 and fuses F1 and F2. The linked switch S1 includes switches S11 and S12. The AC voltage input terminal 10 includes a live wire terminal 11 and a neutral wire terminal 12. The live wire terminal 11 is electrically coupled to a fuse F1 first terminal via the switch S11. The neutral wire terminal 12 is electrically coupled to a fuse F2 first terminal via the switch S12. The voltage conversion circuit 100 includes diodes D1~D4, a Zener diode ZD1, a resistor R1, and capacitors C1 and C5. A diode D1 cathode is electrically coupled to a diode D3 anode, a diode D1 anode is electrically coupled to a diode D2 anode. A diode D2 cathode is electrically coupled to a diode D4 anode. A diode D4 cathode is electrically coupled to a diode D3 cathode.

A connection point between the diodes D1 and D3 is electrically coupled to a fuse F1 second terminal via the capacitor C1. A connection point between the diodes D2 and D4 is electrically coupled to a fuse F2 second terminal. A connection point between the diodes D3 and D4 is electrically coupled to a Zener diode ZD1 cathode via the resistor R1. A Zener diode ZD1 anode is grounded. A connection point between the diodes D1 and D2 is electrically coupled to the Zener diode ZD1 anode. The Zener diode ZD1 cathode outputs the DC voltage. In one embodiment, the DC voltage is +5 volts.

The control circuit 200 includes a comparator A, a transistor Q, a first relay, a second relay, a press stopper S2, a variable resistor VR1, a speaker LS1, diodes D5 and D6, resistors R2, R3, and R5, and capacitors C2 and C3. The first relay includes a winding M1, a normally open contact K1, and a normally closed contact K2. The second relay includes a winding M2 and a normally closed contact K3. A comparator A non-inverting input terminal is electrically coupled to a press stopper S2 first terminal via the normally closed contact K3. A press stopper S2 second terminal receives the +5 volts DC voltage. The comparator A non-inverting input terminal is grounded via the variable resistor VR1 and capacitor C2 respectively. A comparator A inverting input terminal receives the +5 volts DC voltage via the resistor R2. The comparator A inverting input terminal is grounded via the resistor R3. A comparator A output terminal is electrically coupled to a capacitor C3 first terminal via the resistor R5. A capacitor C3 second terminal is grounded.

A connection point between the resistor R5 and capacitor C3 is electrically coupled to a transistor Q base. A transistor Q collector receives the +5 volts DC voltage via the winding M1. The transistor Q collector is electrically coupled to a diode D5 anode. A diode D5 cathode receives the +5 volts DC voltage. A transistor Q emitter is grounded, and is electrically coupled to a winding M2 first terminal via the normally open contact K1. A winding M2 second terminal receives the +5 volts DC voltage. The transistor Q emitter is electrically coupled to a diode D6 anode via the normally open contact K1. A diode D6 cathode receives the +5 volts DC voltage.

The switch circuit 300 includes a thyristor VS1, a Schottky diode D7, a variable resistor VR2, an ampere meter W1, a resistor R4, and capacitors C4 and C6. A capacitor C6 first terminal is electrically coupled to the fuse F1 second terminal. A capacitor C6 second terminal is electrically coupled to the fuse F2 second terminal. The thyristor VS1 includes a control terminal, a first terminal, and a second terminal. The thyristor VS1 control terminal is electrically coupled to a resistor R4 first terminal via the Schottky diode D7. A resistor R4 second terminal is electrically coupled to the fuse F1 second terminal via the variable resistor VR2. The resistor R4 first terminal is electrically coupled to the fuse F2 second terminal via the normally closed contact K2 and the capacitor C4 respectively. The thyristor VS1 first terminal is electrically coupled to the fuse F2 second terminal via the ampere meter W1. The Schottky diode D7 has a turn on voltage. In one embodiment, the Schottky diode D7 turn on voltage is 25 volts.

The current output circuit 400 includes a transformer T1, a voltmeter W2, and a resistor R6. A transformer T1 output terminal outputs the weld current. The thyristor VS1 second terminal is electrically coupled to the fuse F1 second terminal via the transformer T1 input terminal. The thyristor VS1 second terminal is electrically coupled to the fuse F1 second terminal via the voltmeter W2 and resistor R6 respectively.

In an initial state, the capacitor C4 is short-circuited by the normally closed contact K2. When the switches S11 and S12 turn on, the AC voltage from an AC voltage input terminal 10 cannot charge the capacitor C4. In an active state, the switches S11 and S12 are turned on. The AC voltage is converted to a +5 volts DC voltage which provides working voltage to the control circuit 200. The press stopper S2 is pressed, and then released. The +5 volts DC voltage charges the capacitor C2 via the press stopper S2 and normally closed contact K3. The comparator A outputs a high voltage level. The transistor Q turns on, and the winding M1 is powered on. The normally open contact K1 turns on, and the normally closed contact K2 turns off. The AC voltage charges the capacitor C4 via the variable resistor VR2 and resistor R4. When the capacitor C4 is charged to the Schottky diode D7 turn on voltage, the thyristor VS1 turns on. The transformer T1 outputs a weld current of large power at the output terminal The ampere meter W1 and voltmeter W2 tests current and voltage values at the transformer T1 input terminal. The power of the weld current can be calculated by multiplying the current and voltage at the transformer T1 input terminal.

During the weld process, the normally closed contact K3 turns off. The capacitor C2 discharges via the variable resistor VR1. When the voltage on the capacitor C2 decreases to less than a voltage level on the comparator A inverting input terminal, the comparator A outputs a low voltage level. The transistor Q turns off, and the winding M1 is powered off. The normally closed contact K2 turns on again, and the capacitor C4 is short-circuited. The circuit is returned to the initial state. The speaker LS1 buzzes to indicate the weld is starting when the transistor Q turns on. The speaker LS1 stops buzzing to indicate the weld is completed when the transistor Q turns off. In another embodiment, the speaker LS1 can be replaced by LEDs or other indicators.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A weld current generating apparatus, comprising:
a voltage conversion circuit capable of receiving an AC voltage from an AC voltage input terminal, and converting the AC voltage to a DC voltage; wherein the AC voltage input terminal comprises a live wire terminal and a neutral wire terminal; the voltage conversion circuit comprises a first diode, a second diode, a third diode, a fourth diode, a Zener diode, a first resistor, and a first capacitor; a first diode cathode is electrically coupled to a third diode anode; a first diode anode is electrically coupled to a second diode anode; a second diode cathode is electrically coupled to a fourth diode anode; a fourth diode cathode is electrically coupled to a third diode cathode; a connection point between the third and the fourth diode is electrically coupled to a Zener diode cathode via the first resistor; a Zener diode anode is grounded; a connection point between the first and the second diode is electrically coupled to the Zener diode anode; and the Zener diode cathode is capable of outputting the DC voltage;
a control circuit capable of receiving the DC voltage, wherein the control circuit is capable of setting a weld time, and outputting a control signal for controlling the weld time; the control circuit comprises a comparator, a transistor, a first relay, a second relay, a press stopper, a first variable resistor, a second resistor, a third resistor, a second capacitor, and a third capacitor; the first relay comprises a first winding, a first normally open contact, and a first normally closed contact; and the second relay comprises a second winding and a second normally closed contact;
a switch circuit capable of receiving the control signal, and turning on for the duration of the weld time according to the control signal;
a current output circuit capable of outputting a continuous weld current when the switch circuit turns on;
a first fuse and a second fuse; and
a linked switch comprising a first switch and a second switch; wherein the live wire terminal is electrically coupled to a first fuse first terminal via the first switch; the neutral wire terminal is electrically coupled to a second fuse first terminal via the second switch; a connection point between the first and the third diode is electrically coupled to a first fuse second terminal via the first capacitor; and a connection point between the second and the fourth diode is electrically coupled to a second fuse second terminal.

2. The weld current generating apparatus of claim 1, wherein a comparator non-inverting input terminal is electrically coupled to a press stopper first terminal via the second normally closed contact; a press stopper second terminal is capable of receiving the DC voltage; the comparator non-inverting input terminal is grounded via the first variable resistor and the second capacitor respectively; a comparator inverting input terminal is capable of receiving the DC voltage via the second resistor, and is grounded via the third resistor; and a comparator output terminal is grounded via the third capacitor.

3. The weld current generating apparatus of claim 2, wherein the comparator output terminal is electrically coupled to a transistor base; a transistor collector is capable of receiving the DC voltage via the first winding; a transistor emitter is grounded, and is electrically coupled to a second winding first terminal via the first normally open contact; and a second winding second terminal is capable of receiving the DC voltage.

4. The weld current generating apparatus of claim 3, wherein the switch circuit comprises a thyristor, a Schottky diode, a second variable resistor, a fourth resistor, and a fourth capacitor; the thyristor comprises a thyristor control terminal, a thyristor first terminal, and a thyristor second terminal; the current output circuit comprises a transformer; and a transformer output terminal is capable of outputting the continuous weld current.

5. The weld current generating apparatus of claim 4, wherein the thyristor control terminal is electrically coupled to a fourth resistor first terminal via the Schottky diode; a fourth resistor second terminal is electrically coupled to the first fuse second terminal via the second variable resistor; the fourth resistor first terminal is electrically coupled to the second fuse second terminal via the first normally closed contact and the fourth capacitor respectively; the thyristor first terminal is electrically coupled to the second fuse second terminal; and the thyristor second terminal is electrically coupled to the first fuse second terminal via a transformer input terminal.

* * * * *